United States Patent
Ha et al.

(10) Patent No.: US 12,132,207 B2
(45) Date of Patent: *Oct. 29, 2024

(54) POSITIVE ELECTRODE SLURRY COMPOSITION FOR SECONDARY BATTERY, POSITIVE ELECTRODE PREPARED BY USING THE SAME, AND SECONDARY BATTERY INCLUDING THE POSITIVE ELECTRODE

(71) Applicant: LG Energy Solution, Ltd., Seoul (KR)

(72) Inventors: Joo Yeon Ha, Daejeon (KR); Houng Sik Yoo, Daejeon (KR); Dong Hyun Kim, Daejeon (KR); Hyeon Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/025,058

(22) PCT Filed: Mar. 17, 2022

(86) PCT No.: PCT/KR2022/003766
§ 371 (c)(1),
(2) Date: Mar. 7, 2023

(87) PCT Pub. No.: WO2022/197125
PCT Pub. Date: Sep. 22, 2022

(65) Prior Publication Data
US 2023/0335740 A1    Oct. 19, 2023

(30) Foreign Application Priority Data

Mar. 19, 2021 (KR) .................. 10-2021-0036166

(51) Int. Cl.
| | | |
|---|---|---|
| H01B 1/24 | (2006.01) |
| C09D 5/24 | (2006.01) |
| C09D 7/45 | (2018.01) |
| C09D 7/61 | (2018.01) |
| C09D 7/65 | (2018.01) |
| C09D 127/16 | (2006.01) |
| H01M 4/58 | (2010.01) |
| H01M 4/60 | (2006.01) |
| H01M 4/62 | (2006.01) |
| H01M 10/0525 | (2010.01) |
| H01M 4/02 | (2006.01) |

(52) U.S. Cl.
CPC .............. *H01M 4/623* (2013.01); *C09D 5/24* (2013.01); *C09D 7/45* (2018.01); *C09D 7/61* (2018.01); *C09D 7/65* (2018.01); *C09D 127/16* (2013.01); *H01M 4/5825* (2013.01); *H01M 4/625* (2013.01); *H01M 10/0525* (2013.01); H01M 2004/028 (2013.01)

(58) Field of Classification Search
CPC .... H01M 4/623; H01M 4/5825; H01M 4/625; H01M 10/0525; H01M 2004/028; C09D 7/65; C09D 7/61; C09D 7/45; C09D 5/24; C09D 127/16

See application file for complete search history.

(56) References Cited

U.S. PATENT DOCUMENTS

| | | | | |
|---|---|---|---|---|
| 11,824,200 | B2* | 11/2023 | Kim | H01M 4/625 |
| 2016/0200850 | A1* | 7/2016 | Hatanaka | C08F 226/06 |
| | | | | 526/260 |
| 2018/0277848 | A1* | 9/2018 | Matsumura | H01M 10/0525 |
| 2019/0218326 | A1* | 7/2019 | Hatanaka | C09D 105/04 |
| 2020/0028174 | A1* | 1/2020 | Ahn | H01M 10/0525 |
| 2022/0158193 | A1* | 5/2022 | DuPasquier | H01M 4/623 |
| 2022/0209239 | A1 | 6/2022 | Kim et al. | |
| 2023/0335740 | A1* | 10/2023 | Ha | C09D 127/16 |
| 2024/0047687 | A1* | 2/2024 | Kim | H01M 4/13 |

FOREIGN PATENT DOCUMENTS

| | | |
|---|---|---|
| JP | 2013206759 A | 10/2013 |
| JP | 5861896 B2 | 2/2016 |
| JP | 6079386 B2 | 2/2017 |
| JP | 2020187866 A | 11/2020 |
| KR | 20150016852 A | 2/2015 |
| KR | 20180107758 A | 10/2018 |
| KR | 20180107759 A | 10/2018 |
| KR | 102134299 B1 | 7/2020 |
| KR | 20200126205 A | 11/2020 |
| KR | 20200132350 A | 11/2020 |
| KR | 20200132721 A | 11/2020 |

OTHER PUBLICATIONS

International Search Report for PCT/KR2022/003766 mailed Jun. 20, 2022. 3 pages.

* cited by examiner

*Primary Examiner* — Haidung D Nguyen
(74) *Attorney, Agent, or Firm* — Lerner David LLP

(57) ABSTRACT

A positive electrode slurry composition, a positive electrode and a secondary battery including the same are disclosed herein. In some embodiments, a slurry composition includes a lithium iron phosphate-based positive electrode active material, a binder, a conductive agent, a dispersant, and a solvent, wherein the dispersant includes a nitrile-based copolymer and a polymer dispersant containing an oxyalkylene unit, wherein the oxyalkylene unit is present in an amount of 60 wt % or more, based on the total weight of the polymer dispersant.

11 Claims, 2 Drawing Sheets

[FIG.1]
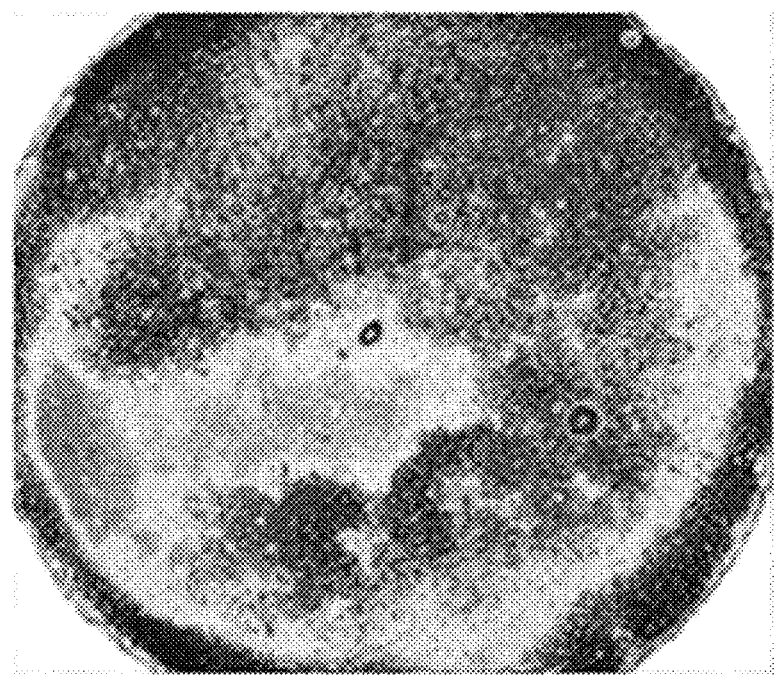

[FIG.2]
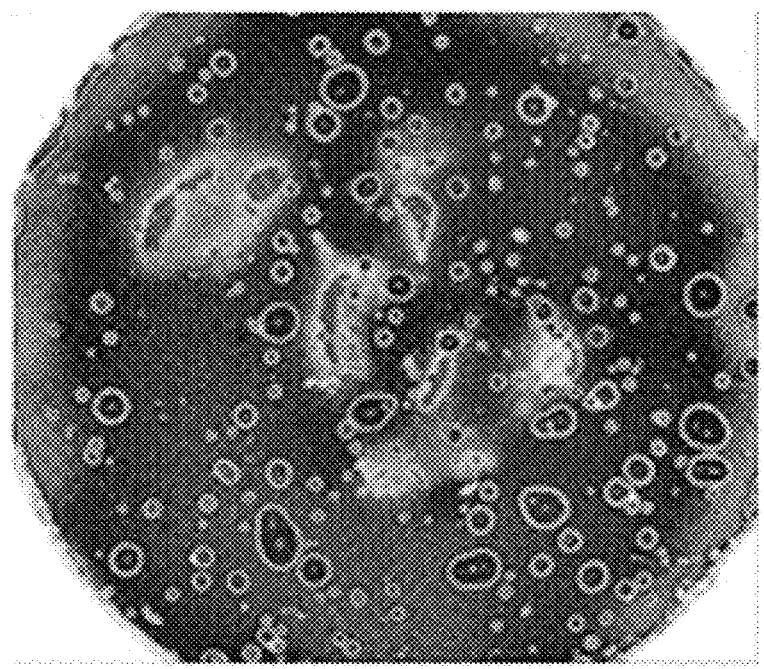

POSITIVE ELECTRODE SLURRY COMPOSITION FOR SECONDARY BATTERY, POSITIVE ELECTRODE PREPARED BY USING THE SAME, AND SECONDARY BATTERY INCLUDING THE POSITIVE ELECTRODE

CROSS-REFERENCE TO RELATED APPLICATIONS

This application is a national phase entry under 35 U.S.C. § 371 of International Application No. PCT/KR2022/003766, filed on Mar. 17, 2022, which claims priority from Korean Patent Application No. 10-2021-0036166, filed on Mar. 19, 2021, the disclosures of which are incorporated by reference herein.

TECHNICAL FIELD

The present invention relates to a positive electrode slurry composition for a secondary battery, a positive electrode prepared by using the same, and a secondary battery including the positive electrode, and more particularly, to a positive electrode slurry composition including a lithium iron phosphate-based positive electrode active material, and a positive electrode and a secondary battery which are prepared by using the same.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium metal oxides, such as $LiCoO_2$, $LiFePO_4$, and $LiNi_aCo_bM_cO_2$ (where M is at least one of manganese (Mn) and aluminum (Al), and $0<a<1$, $0<b<1$, and $0<c<1$), have been used as a positive electrode active material of the lithium secondary battery. Among them, a lithium iron phosphate-based positive electrode active material, such as $LifePO_4$, has a voltage versus lithium of about 3.5 V, a high bulk density of about 3.6 $g/cm^3$, and a theoretical capacity of about 170 mAh/g, and has advantages of low price as well as excellent high-temperature stability. The lithium iron phosphate-based positive electrode active material is a structurally very stable positive electrode active material, but is disadvantageous in that electrical conductivity and ionic conductivity are low. Thus, the lithium iron phosphate-based positive electrode active material is used by coating carbon on a surface of the lithium iron phosphate-based positive electrode active material to improve the electrical conductivity and reducing a particle size of the lithium iron phosphate-based positive electrode active material to improve the ionic conductivity. However, as the particle size of the positive electrode active material decreases, a specific surface area is increased, aggregation between the positive electrode active material particles occurs severely to reduce dispersibility, and, as a result, there is a problem in that viscosity of a positive electrode slurry composition is increased to reduce coating processability during preparation of a positive electrode. The viscosity may be reduced by decreasing a solid content of the positive electrode slurry composition, but, in this case, a coating process must be performed many times to form a positive electrode active material layer to a desired thickness, and productivity is reduced. Also, efficiency of a drying process for removing a solvent included in the slurry may be reduced, and electrode adhesion may be reduced due to binder migration.

Therefore, there is a need to develop a positive electrode slurry composition using a lithium iron phosphate-based positive electrode active material having low viscosity characteristics even when a solid content is high.

DISCLOSURE OF THE INVENTION

Technical Problem

An aspect of the present invention provides a positive electrode slurry composition including a lithium iron phosphate positive electrode active material having low viscosity characteristics and less aggregation of lithium iron phosphate particles even when a solid content is high.

Another aspect of the present invention provides a positive electrode prepared by using the above-described positive electrode slurry composition and a lithium secondary battery including the positive electrode.

Technical Solution

According to an aspect of the present invention, there is provided a positive electrode slurry composition for a secondary battery which includes a lithium iron phosphate-based positive electrode active material, a binder, a conductive agent, a dispersant, and a solvent, wherein the dispersant includes a nitrile-based copolymer, as a first dispersant, and a polymer dispersant containing an oxyalkylene unit as a second dispersant, wherein the oxyalkylene unit is present in an amount of 60 wt % or more, based on the total weight of the polymer dispersant.

According to another aspect of the present invention, there is provided a positive electrode prepared by using the positive electrode slurry composition for a secondary battery according to the present invention and a lithium secondary battery including the positive electrode.

Advantageous Effects

A positive electrode slurry composition according to the present invention has lower viscosity characteristics than a conventional positive electrode slurry composition including a lithium iron phosphate-based positive electrode active material by using two specific types of dispersants together.

The lithium iron phosphate-based positive electrode active material is a structurally very stable positive electrode active material, but is disadvantageous in that electrical conductivity and ionic conductivity are low. Thus, the lithium iron phosphate-based positive electrode active material is used by coating carbon on a surface of the lithium iron phosphate-based positive electrode active material to improve the electrical conductivity and reducing a particle size of the lithium iron phosphate-based positive electrode active material to improve the ionic conductivity. However, as the particle size of the positive electrode active material decreases as described above, aggregation between the positive electrode active material particles occurs severely to increase viscosity of the positive electrode slurry composition, and, as a result, there has been a problem in that coating processability is reduced during preparation of a positive electrode and it is difficult to form a uniform positive electrode active material layer. Thus, typically, the viscosity was reduced by decreasing a solid content of the positive electrode slurry composition using the lithium iron phosphate-based positive electrode active material. However, in s case in which the solid content in the positive electrode slurry composition is low, a coating process must be performed many times to prepare a positive electrode with a desired thickness, and there is a problem in that electrode adhesion is reduced due to binder migration.

The present invention is to solve the above-described problems, wherein the present invention allows to suppress the particle aggregation even when a lithium iron phosphate-based positive electrode active material having a small particle size is used and achieve low viscosity characteristics by using two specific types of dispersants capable of improving dispersibility of the lithium iron phosphate-based positive electrode active material in the positive electrode slurry composition. According to the present invention, low viscosity may be achieved even if the solid content in the positive electrode slurry composition is increased in comparison to a conventional case, and an effect of improving coatability and electrode adhesion may be obtained during the preparation of the positive electrode.

BRIEF DESCRIPTION OF THE DRAWINGS

FIG. 1 is a photograph showing a state of a filter after passing through a positive electrode slurry composition of Example 1; and FIG. 2 is a photograph showing a state of a filter after passing through a positive electrode slurry composition of Comparative Example 1.

MODE FOR CARRYING OUT THE INVENTION

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

In the present specification, the expression "weight-average molecular weight" denotes a standard polystyrene-equivalent value measured by gel permeation chromatography (GPC). Specifically, the weight-average molecular weight is a value obtained by converting a value measured under the following conditions using the GPC, and standard polystyrene of an Agilent system was used to prepare a calibration curve.
<Measurement Conditions>
Measuring instrument: Agilent GPC (Agulent 1200 series, USA)
Column: two PL mixed B columns in series
Column temperature: 40° C.
Eluent: tetrahydrofuran
Flow rate: 1.0 mL/min
Concentration: ~1 mg/mL (100 μL injection)
The expression "amine value" in the present specification may be measured by the following method. First, 0.5 g to 1.5 g of a polymer dispersant sample is taken, put into a 100 ml beaker, accurately weighed, and then dissolved with 50 mL of acetic acid to prepare a sample. Then, the sample is neutralization-titrated with a HC104 acetic acid solution having a concentration of 0.1 mol/L using an automatic titrator provided with a pH electrode to obtain a titration pH curve, and an amine value is calculated through the following equation by using an inflection point of the titration pH curve as a titration end point.

Amine value [mg KOH/g]=(561×V)/(W×S)

In the above equation, W is a weighed amount (g) of the polymer dispersant sample, V is a titration amount (mL) at the titration end point, and S is a solid content (wt %) of the polymer dispersant sample.

The expression "average particle diameter (D50)" in the present specification is a value measured by a wet laser diffraction scattering method, wherein it was measured by diluting 1 ml of a positive electrode slurry composition by 20 times using a Malvern Mastersizer 3000.

Hereinafter, the present invention will be described in detail.

Positive Electrode Slurry Composition

First, a positive electrode slurry composition according to the present invention will be described.

The positive electrode slurry composition according to the present invention includes (1) a lithium iron phosphate-based positive electrode active material, (2) a binder, (3) a conductive agent, (4) a dispersant, and (5) a solvent, wherein the dispersant includes (4-1) a nitrile-based copolymer, as a first dispersant, and (4-2) a polymer dispersant containing an oxyalkylene unit as a second dispersant, wherein the oxyalkylene unit is present in an amount of 60 wt % or more, preferably, 60 wt % to 99 wt %, based on the total weight of the polymer dispersant.

Hereinafter, each component of the positive electrode slurry composition according to the present invention will be described in detail.

(1) Positive Electrode Active Material

The positive electrode slurry composition according to the present invention includes a lithium iron phosphate-based positive electrode active material as a positive electrode active material.

Specifically, the lithium iron phosphate-based positive electrode active material may be represented by the following Formula 1.

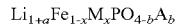   [Formula 1]

In Formula 1, M is at least one selected from the group consisting of Mn, Ni, Co, Cu, Sc, Ti, Cr, V, Zn, A is at least one selected from the group consisting of S, Se, F, Cl, and I, and −0.5<a<0.5, 0≤x<0.5, and 0≤b≤0.1.

For example, the lithium iron phosphate-based positive electrode active material may be LifePO$_4$. Also, the lithium iron phosphate-based positive electrode active material may be coated with a carbon-based material on a particle surface in order to improve electrical conductivity.

The lithium iron phosphate-based positive electrode active material may have an average particle diameter (D50) of 5 μm or less, preferably 0.5 μm to 5 μm, and more preferably 0.5 μm to 3 μm. When the average particle diameter (D50) of the lithium iron phosphate-based positive electrode active material satisfies the above range, an effect of improving lithium ion conductivity may be obtained.

The positive electrode active material may be included in an amount of 85 parts by weight to 99.7 parts by weight, preferably 90 parts by weight to 99 parts by weight, and more preferably 90 parts by weight to 97 parts by weight based on 100 parts by weight of a total solid content in the positive electrode slurry composition. When the amount of the positive electrode active material satisfies the above range, a positive electrode having excellent capacity characteristics may be prepared.

(2) Binder

The binder is to ensure adhesion between positive electrode active material particles or between the positive electrode active material and a current collector, wherein common binders used in the art may be used, and types thereof are not particularly limited.

The binder, for example, may include polyvinylidene fluoride (PVdF), polyvinylidene fluoride-hexafluoropropylene copolymer (PVdF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated-EPDM, a styrene-butadiene rubber (SBR), a fluorine rubber, or various copolymers thereof, and any one thereof or a mixture of two or more thereof may be used. Preferably, the binder may be polyvinylidene fluoride (PVdF), polyvinylidene fluoride-hexafluoropropylene copolymer (PVdF-co-HFP), or a mixture thereof.

The binder may be included in an amount of 0.1 part by weight to 10 parts by weight, preferably 0.5 part by weight to 8 parts by weight, and more preferably 1 part by weight to 5 parts by weight based on 100 parts by weight of the total solid content in the positive electrode slurry composition. In a case in which the amount of the binder satisfies the above range, excellent electrode adhesion may be achieved while minimizing an increase in electrode resistance.

(3) Conductive Agent

The conductive agent is used to provide conductivity to the electrode, wherein any conductive agent may be used without particular limitation as long as it has suitable electrical conductivity without causing adverse chemical changes in the secondary battery.

For example, at least one selected from the group consisting of graphite such as natural graphite or artificial graphite; carbon based materials such as carbon black, acetylene black, Ketjen black, channel black, furnace black, lamp black, thermal black, carbon nanotubes, and carbon fibers; powder or fibers of metal such as copper, nickel, aluminum, and silver; conductive whiskers such as zinc oxide whiskers and potassium titanate whiskers; conductive metal oxides such as titanium oxide; and conductive polymers, such as polyphenylene derivatives, may be used as the conductive agent. Preferably, the conductive agent may be a carbon-based material such as carbon nanotubes or carbon black.

The conductive agent may be included in an amount of 0.1 part by weight to 5 parts by weight, preferably 0.5 part by weight to 5 parts by weight, and more preferably 1 part by weight to 3 parts by weight based on 100 parts by weight of the total solid content in the positive electrode slurry composition. In a case in which the amount of the conductive agent satisfies the above range, an electrode with low resistance and excellent output characteristics may be prepared while minimizing a decrease in positive electrode capacity.

(4) Dispersant

The positive electrode slurry composition according to the present invention includes two types of dispersants to prevent aggregation of the lithium iron phosphate-based positive electrode active material. Specifically, the positive electrode slurry composition according to the present invention includes a nitrile-based copolymer, as a first dispersant, and a polymer dispersant containing an oxyalkylene unit as a second dispersant.

(4-1) First Dispersant

The first dispersant is a nitrile-based copolymer, and, specifically, may be a copolymer having an α,β-unsaturated nitrile-derived unit and a conjugated diene-derived unit. In this case, the conjugated diene-derived unit may be partially or entirely hydrogenated. A hydrogenation method of the conjugated diene may be performed by a hydrogenation reaction known in the art, for example, a catalytic hydrogenation reaction using a catalyst system such as rhodium (Rh), ruthenium (Ru), palladium (Pd), and iridium (Ir), and a hydrogenation rate may be adjusted by controlling an amount of the catalyst, a reaction hydrogen pressure, and reaction time.

The nitrile-based copolymer may be prepared by copolymerizing an α,β-unsaturated nitrile monomer and a conjugated diene-based monomer, and then hydrogenating a C=C double bond in the copolymer. The polymerization and hydrogenation of the monomers may be performed according to conventional methods.

As the α,β-unsaturated nitrile monomer, for example, acrylonitrile or methacrylonitrile may be used, and any one thereof or a mixture of two or more thereof may be used.

As the conjugated diene-based monomer, for example, conjugated diene-based monomers having 4 to 6 carbon atoms, such as 1,3-butadiene, isoprene, or 2,3-methyl butadiene, may be used, and any one thereof or a mixture of two or more thereof may be used.

The nitrile-based copolymer may include the α,β-unsaturated nitrile-derived unit and the conjugated diene-derived unit in amounts such that a weight ratio of the α,β-unsaturated nitrile-derived unit: the conjugated diene-derived unit is in a range of 10~50:50~90, preferably 20~40:60~80, and more preferably 25~40:60~75. When the amount of each unit in the nitrile-based copolymer satisfies the above range, dispersibility and high-temperature characteristics are excellent. Herein, the amount of the α,β-unsaturated nitrile-derived unit may be measured as a median of values quantified by measuring an amount of nitrogen generated according to a mill oven method of JIS K 6364 and converting a binding amount thereof from a molecular weight of α,β-unsaturated nitrile, and the amount of the conjugated diene-derived unit may be calculated by subtracting a weight of the α,β-unsaturated nitrile-derived unit from a weight of the total copolymer.

The nitrile-based copolymer of the present invention has a hydrogenation rate of the conjugated diene-based unit of 80% or more, for example, 90%. The reason for this is that, in a case in which a dispersant, in which an unhydrogenated conjugated diene unit remains, is used, reactivity with an electrolyte solution is increased due to the double bond in the conjugated diene to degrade high-temperature characteristics.

Specifically, the nitrile-based copolymer may include a repeating unit represented by the following Formula 2 and a repeating unit represented by the following Formula 3.

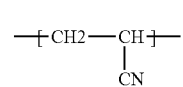

[Formula 2]

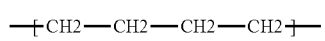

[Formula 3]

In this case, an amount of the repeating unit represented by Formula 2 may be in a range of 10 wt % to 50 wt %, preferably 20 wt % to 40 wt %, and more preferably 25 wt % to 40 wt %, and an amount of the repeating unit represented by Formula 3 may be in a range of 50 wt % to 90 wt %, preferably 60 wt % to 80 wt %, and more preferably 60 wt % to 75 wt %.

More specifically, the first dispersant may be a hydrogenated acrylonitrile-butadiene copolymer.

The nitrile-based copolymer may have a weight-average molecular weight of 10,000 g/mol to 100,000 g/mol, preferably 20,000 g/mol to 100,000 g/mol, and more preferably 20,000 g/mol to 50,000 g/mol. In a case in which the nitrile-based copolymer having the above-described weight-average molecular weight is used, the lithium iron phosphate-based positive electrode active material may be uniformly dispersed with a small amount of the dispersant, and an effect of reducing viscosity of the positive electrode slurry composition is more excellent.

(4-2) Second Dispersant

The second dispersant is used together with the first dispersant to improve the dispersibility of the lithium iron phosphate-based positive electrode active material, wherein it is a polymer dispersant containing an oxyalkylene unit in an amount of 60 wt % or more, preferably, 60 wt % to 99 wt %, based on the total weight of the polymer dispersant.

The oxyalkylene unit may be represented by the following Formula 4.

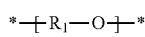

[Formula 4]

In Formula 4, $R_1$ is an alkylene group having 1 to 20 carbon atoms, preferably an alkylene group having 2 to 10 carbon atoms, and more preferably an alkylene group having 2 to 5 carbon atoms.

The oxyalkylene unit is included in an amount of 60 wt % or more, preferably 60 wt % to 99 wt %, and more preferably 60 wt % to 98 wt % based on a total weight of the polymer dispersant. According to the study of the present inventors, in a case in which a polymer dispersant, in which the amount of the oxyalkylene unit of 60 wt % or more, is used together with the nitrile-based copolymer dispersant, the viscosity of the positive electrode slurry composition is significantly reduced, but, in a case in which a polymer dispersant, in which the amount of the oxyalkylene unit of less than 60 wt %, is used, it has been found that the viscosity of the positive electrode slurry composition is rather increased.

The polymer dispersant may further include other units in addition to the oxyalkylene unit. For example, the polymer dispersant may further include a unit derived from at least one compound selected from the group consisting of a urethane-based compound and a phosphoric acid ester-based compound, but the present invention is not limited thereto.

The polymer dispersant may be prepared by using a method of preparing a copolymer which is well known in the art. For example, the polymer dispersant may be prepared by mixing a compound capable of deriving an oxyalkylene unit and a compound capable of deriving a unit other than the oxyalkylene unit and then performing polymerization or an acid-base reaction. In this case, as the compound capable of deriving an oxyalkylene unit, for example, polyalkylene glycol, such as polyethylene glycol and polypropylene glycol, or an alkylene oxide-based compound, such as (poly) ethylene oxide and (poly) propylene oxide, may be used, but the present invention is not limited thereto.

The polymer dispersant may have a weight-average molecular weight of 800 g/mol to 20,000 g/mol, preferably 800 g/mol to 10,000 g/mol, and more preferably 1,000 g/mol to 10,000 g/mol. When the weight-average molecular weight of the polymer dispersant satisfies the above range, the effect of reducing the viscosity of the positive electrode slurry composition is excellent.

Also, the polymer dispersant may have an amine value of 30 mg KOH/g to 90 mg KOH/g, preferably 36 mg KOH/g to 80 mg KOH/g, and more preferably 40 mg KOH/g to 80 mg KOH/g. When the amine value of the polymer dispersant satisfies the above range, since hydrogen bonding of the polymer dispersant with organic functional groups, such as —OH, —COOH, and —C=O, on a surface of the lithium iron phosphate-based positive electrode active material increases, the dispersibility of the lithium iron phosphate-based positive electrode active material is improved and the effect of reducing the viscosity of the positive electrode slurry composition is excellent.

In the present invention, the nitrile-based copolymer and the polymer dispersant may be included in a weight ratio of 1:1 to 5:1, preferably 1:1 to 4:1, and more preferably 2:1 to 4:1. When the mixing ratio of the nitrile-based copolymer to the polymer dispersant satisfies the above range, an effect of improving the viscosity is particularly excellent.

A total amount of the dispersant, in which the first dispersant and the second dispersant are combined, may be in a range of 0.1 part by weight to 3 parts by weight, preferably 0.1 part by weight to 2 parts by weight, and more preferably 0.5 part by weight to 2 parts by weight based on 100 parts by weight of the total solid content in the positive electrode slurry composition. When the amount of the dispersant satisfies the above range, the viscosity of the positive electrode slurry composition may be effectively reduced. If the amount of the dispersant is excessively small, the effect of improving the viscosity is insignificant, and, if the amount of the dispersant is excessively large, physical properties, such as capacity, may be deteriorated.

(5) Solvent

The solvent is for uniformly mixing each component in the positive electrode slurry composition and for performing a coating process, wherein solvents of the positive electrode slurry composition, which are generally used in the art, may be used without limitation.

For example, the solvent may be water, an organic solvent, or a mixture thereof. For example, the organic solvent may include an amide-based polar organic solvent such as dimethylformamide (DMF), diethylformamide, dimethylacetamide (DMAc), and N-methylpyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 2-methyl-2-propanol (tert-butanol), pentanol, hexanol, heptanol, or octanol; glycols such as ethylene glycol, diethylene glycol, triethylene glycol, propylene glycol, 1,3-propanediol, 1,3-butanediol, 1,5-pentanediol, or hexylene glycol; polyhydric alcohols such as glycerin, trimethylolpropane, pentaerythritol, or sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, or tetraethylene glycol monobutyl ether;

ketones such as acetone, methyl ethyl ketone, methyl propyl ketone, or cyclopentanone; and esters such as ethyl acetate, Y-butyrolactone, and s-propiolactone, and any one thereof or a mixture of two or more thereof may be used, but the present invention is not limited thereto.

The solvent may be included in an amount such that the solid content in the positive electrode slurry composition is 55 wt % or more, preferably 55 wt % to 85 wt %, and more preferably 55 wt % to 80 wt %. In a case in which the solid content of the electrode slurry is less than 55 wt %, an electrode loading amount may be decreased to increase processing costs, binder migration may occur to reduce electrode adhesion, and coating defects may occur.

The positive electrode slurry composition of the present invention may be prepared by mixing the above-described components. In this case, the mixing of each component may be performed simultaneously or may be performed sequentially.

For example, the positive electrode slurry composition of the present invention may be prepared by adding a positive electrode active material, a conductive agent, a binder, and a dispersant into a solvent at the same time and then dispersing them, and may also be prepared by a method of additionally adding a conductive agent, a binder, and a solvent after pre-dispersing by mixing a positive electrode active material and a dispersant in a solvent or a method of additionally adding an active material, a dispersant, a binder, and a solvent after pre-dispersing by mixing a conductive agent in a solvent.

The positive electrode slurry composition according to the present invention as described above has low viscosity characteristics. Specifically, the positive electrode slurry composition of the present invention has a viscosity measured at 1 rpm and 25° C. of 20 Pa·s or less, preferably 1 Pas to 20 Pa·s, and more preferably 5 Pa·s to 18 Pa·s.

Positive Electrode

Next, a positive electrode according to the present invention will be described.

The positive electrode according to the present invention is prepared by using the above-described positive electrode slurry composition of the present invention. As described above, in the positive electrode slurry composition according to the present invention, since the binder may be evenly distributed in the positive electrode active material as the dispersibility of the lithium iron phosphate-based positive electrode active material is improved, electrode adhesion may be improved when the positive electrode is prepared by using the positive electrode slurry composition according to the present invention. Also, since a migration phenomenon of the binder, which occurs when the solvent of the slurry is volatilized, may be reduced as the solid content of the final positive electrode slurry is increased, the adhesion between the current collector and a positive electrode active material layer may be improved.

Specifically, the positive electrode includes a positive electrode collector, and a positive electrode active material layer which is disposed on at least one surface of the positive electrode collector and is formed by using the above-described slurry composition for a positive electrode.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode may be prepared according to a typical method of preparing a positive electrode except that the above-described positive electrode slurry composition is used. Specifically, the above-described positive electrode slurry composition is coated on the positive electrode collector, and the positive electrode may then be prepared by drying and rolling the coated positive electrode collector.

Also, as another method, the positive electrode may be prepared by casting the above-described slurry composition for a positive electrode on a separate support and then laminating a film separated from the support on the positive electrode collector.

Electrochemical Device

Next, an electrochemical device according to the present invention will be described. The electrochemical device includes the positive electrode of the present invention, wherein the electrochemical device may specifically be a battery or a capacitor, and may more specifically be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is the same as described above. Also, the lithium secondary battery may further optionally include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer optionally includes a binder and a conductive agent in addition to a negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material.

Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, mesocarbon microbeads, mesophase pitches, and high-temperature sintered carbon such as petroleum or coal tar pitch derived cokes.

Also, the binder and the conductive agent may be the same as those previously described for the positive electrode slurry composition.

The negative electrode may be prepared by coating a negative electrode slurry composition, which is prepared by dissolving or dispersing optionally the binder and the conductive agent as well as the negative electrode active material in a solvent, on the negative electrode collector and drying the coated negative electrode collector, or may be prepared by casting the negative electrode slurry composition on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be optionally used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R-CN (where R is a linear, branched, or cyclic C2-C20 hydrocarbon group and may include a double-bond, an aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 4.0 M. If the concentration of the lithium salt is included within the above range, since the electrolyte may have appropriate conductivity and viscosity, excellent performance of the electrolyte may be obtained and lithium ions may effectively move.

In order to improve life characteristics of the battery, suppress a reduction in battery capacity, and improve discharge capacity of the battery, an additive may be further included in the electrolyte in addition to the electrolyte components. In this case, the additive may be included in an amount of 0.1 wt % to 5 wt % based on a total weight of the electrolyte.

As described above, since the lithium secondary battery according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Specifications of each component used in the following Examples and Comparative Examples are as follows.

(A) Positive electrode active material: $LiFePO_4$ having an average particle diameter D50 of 2.2 μm was used.

(B) Conductive agent: Carbon nanotubes having a Brunauer-Emmett-Teller (BET) specific surface area of 185 m$^2$/g were used.

(C) Binder: PVdF having a weight-average molecular weight (Mw) of 630,000 g/mol was used.

(D) First dispersant: A hydrogenated acrylonitrile-butadiene rubber (H-NBR, weight ratio of acrylonitrile unit:hydrogenated butadiene unit=34:66) having a weight-average molecular weight (Mw) of 34,000 g/mol was used.

(E) Second dispersant: The following polymer dispersants (E1) to (E7) were used as the second dispersant, and acid values, amine values, weight-average molecular weights, and a weight ratio of each unit in the polymer of the polymer dispersants (E1) to (E7) are listed in Table 1 below.

An amount of oxyalkylene unit in the polymer dispersant was measured by nuclear magnetic resonance (NMR).

(E1) DISPERBYK-9076 (amine value 44 mg KOH/g) by BYK was used.

(E2) DISPERBYK-145 (amine value 71 mg KOH/g) by BYK was used.

(E3) DISPERBYK-2155 (amine value 48 mg KOH/g) by BYK was used.

(E4) BYK Synergist-2100 by BYK, a copper phthalocyanine-based compound, was used.

(E5) Polyacrylic acid (weight-average molecular weight 5,000 g/mol) by Wako Pure Chemical Corporation was used.

(E6) Tannic acid by SIGMA-ALDRICH was used.

(E7) DISPERBYK-187 (amine value 35 mg KOH/g) by BYK was used.

TABLE 1

| | Composition (wt %) | | Amine value (mg KOH/g) | weight-average molecular weight (g/mol) |
|---|---|---|---|---|
| | Oxyalkylene | Other components | | |
| E1 | 96.98 | 3.02 | 44 | 5,100 |
| E2 | 82.60 | 17.40 | 71 | 2,100 |
| E3 | 62.42 | 37.58 | 48 | 8,440 |
| E4 | 0 | 100 | — | 1,284 |
| E5 | 0 | 100 | — | 5,000 |
| E6 | 0 | 100 | — | 1,701 |
| E7 | 53.6 | 46.4 | 35.0 | 10,200 |

EXAMPLE 1

After the positive electrode active material (A), the conductive agent (B), the binder (C), the first dispersant (D), and the second dispersant (E1) were added into N-methyl-2-pyrrolidone in a weight ratio of 95.06:1.04:3.00:0.675:0.225 so that a solid content became 65 wt %, 75 g of the solution was weighed and put into a 250 mL container, and was mixed at 3,000 rpm for 15 minutes using a 700 mm diameter saw-type impeller (VMA-GETZMANN GMBH, DISPERMAT CN20) to prepare a positive electrode slurry composition.

EXAMPLE 2

A positive electrode slurry composition was prepared in the same manner as in Example 1 except that (E2), instead of (E1), was used as the second dispersant.

EXAMPLE 3

A positive electrode slurry composition was prepared in the same manner as in Example 1 except that (E3), instead of (E1), was used as the second dispersant.

COMPARATIVE EXAMPLE 1

A positive electrode slurry composition was prepared in the same manner as in Example 1 except that the second dispersant (E1) was not added, and the positive electrode active material (A), the conductive agent (B), the binder (C), and the first dispersant (D) were added in a weight ratio of 95.06:1.04:3.00:0.9.

COMPARATIVE EXAMPLE 2

A positive electrode slurry composition was prepared in the same manner as in Example 1 except that (E4), instead of (E1), was used as the second dispersant.

COMPARATIVE EXAMPLE 3

A positive electrode slurry composition was prepared in the same manner as in Example 1 except that (E5), instead of (E1), was used as the second dispersant.

COMPARATIVE EXAMPLE 4

A positive electrode slurry composition was prepared in the same manner as in Example 1 except that (E6), instead of (E1), was used as the second dispersant.

COMPARATIVE EXAMPLE 5

A positive electrode slurry composition was prepared in the same manner as in Example 1 except that (E7), instead of (E1), was used as the second dispersant.

EXPERIMENTAL EXAMPLE 1

Viscosities of the positive electrode slurry compositions prepared by the examples and comparative examples were measured at 1 rpm and 25° C. using a viscometer (TOKI SANGYO CO., LTD., viscometer TV-22).

Also, viscosity reduction rates of the positive electrode slurry compositions of Examples 1 to 3 and Comparative Examples 2 to 5 were e calculated based on the viscosity of the positive electrode slurry composition of Comparative Example 1 in which the second dispersant was not used. Specifically, the viscosity reduction rate means a value obtained by dividing a value, which is obtained by subtracting the viscosity of each of the positive electrode slurry compositions prepared in Examples 1 to 3 and Comparative Examples 2 to 5 from the viscosity of the positive electrode slurry composition of Comparative Example 1, by the viscosity of the positive electrode slurry composition of Comparative Example 1 and then multiplying 100.

Measurement results are presented in Table 2 below.

TABLE 2

| | Viscosity (Pa · s) | Viscosity reduction rate (%) |
|---|---|---|
| Comparative Example 1 | 22.74 | — |
| Example 1 | 14.28 | 37.20 |
| Example 2 | 15.11 | 33.66 |
| Example 3 | 14.7 | 36.36 |
| Comparative Example 2 | Not measurable | — |
| Comparative Example 3 | Not measurable | — |
| Comparative Example 4 | 46.36 | −103.83 |
| Comparative Example 5 | 28.44 | −26.07 |

As illustrated in Table 2, with respect to the positive electrode slurry compositions of Examples 1 to 3 in which the nitrile-based copolymer dispersant and the polymer dispersant containing 60 wt % or more of oxyalkylene unit were used together, they exhibited lower viscosity characteristics than the positive electrode slurry composition of Comparative Example 1 using the nitrile-based copolymer dispersant alone.

With respect to Comparative Examples 2 to 4 in which the nitrile copolymer and the polymer dispersant not containing an oxyalkylene unit were used together, they exhibited higher viscosity characteristics than the positive electrode slurry composition of Comparative Example 1.

Also, in a case in which the amount of the oxyalkylene unit was less than 60 wt % even if the polymer dispersant containing the oxyalkylene unit was used as in Comparative Example 5, it may be confirmed that the viscosity of the positive electrode slurry composition was rather increased.

EXPERIMENTAL EXAMPLE 2

After 250 g of each of the positive electrode slurry compositions prepared by Examples 1 to 3 and Comparative Examples 1 to 4 was prepared and passed through a 100 mesh filter using a vacuum pump, the number of large particles remaining on the filter was checked by using VR-500 by KEYENCE CORPORATION, and whether or not each positive electrode slurry composition passed through the filter was evaluated according to the following criteria. Evaluation results are presented in [Table 3] below.

OK: a case where the number of large particles with a cross-sectional area of 0.5 mm² or more was 10 or less NG: a case where the number of large particles with a cross-sectional area of 0.5 mm² or more was greater than 10

Also, a photograph showing a state of the filter after passing through the positive electrode slurry composition of Example 1 was illustrated in FIG. 1, and a photograph showing a state of the filter after passing through the positive electrode slurry composition of Comparative Example 1 was illustrated in FIG. 2.

EXPERIMENTAL EXAMPLE 3

After each of the positive electrode slurry compositions prepared by Examples 1 to 3 and Comparative Examples 1 to 4 was coated on an aluminum current collector to a thickness of 100 μm using a bar coater, the presence or absence of surface line defects was visually observed, and coatability was evaluated according to the following criteria. Evaluation results are presented in Table 3.

OK: a case where line-shaped defects were not observed after coating

NG: a case where defects, in which a portion of the current collector was exposed in a line shape, were observed after coating

TABLE 3

| | Whether or not pass through the filter | Coatability |
|---|---|---|
| Example 1 | OK | OK |
| Example 2 | OK | OK |
| Example 3 | OK | OK |
| Comparative Example 1 | NG | NG |
| Comparative Example 2 | NG | NG |
| Comparative Example 3 | NG | NG |
| Comparative Example 4 | NG | NG |
| Comparative Example 5 | NG | NG |

From Table 3 and FIG. 1, with respect to the positive electrode slurry compositions of Examples 1 to 3 in which the nitrile-based copolymer dispersant and the polymer dispersant containing 60 wt % or more of oxyalkylene unit were used together, since particle aggregation in the positive electrode slurry composition was small, it may be confirmed that the number of large particles with a cross-sectional area of 0.5 mm² or more was small at 10 or less and coating quality was excellent.

In contrast, as illustrated in Table 3 and FIG. 2, with respect to the positive electrode slurry compositions of Comparative Examples 1 to 5, aggregation occurred to increase an amount of large particles, and surface line defects occurred after coating due to the large particles during the slurry coating.

The invention claimed is:

1. A positive electrode slurry composition for a secondary battery, the positive electrode slurry composition comprising:
   a lithium iron phosphate-based positive electrode active material;
   a binder;
   a conductive agent;
   a dispersant; and
   a solvent,
   wherein the dispersant comprises a nitrile-based copolymer, as a first dispersant, and a polymer dispersant containing an oxyalkylene unit where the oxyalkylene unit is present in an amount of 60 wt % or more, based on the total weight of the polymer dispersant, as a second dispersant.

2. The positive electrode slurry composition for a secondary battery of claim 1, wherein the polymer dispersant has a weight-average molecular weight of 800 g/mol to 20,000 g/mol.

3. The positive electrode slurry composition for a secondary battery of claim 1, wherein the polymer dispersant has an amine value of 40 mg KOH/g to 80 mg KOH/g.

4. The positive electrode slurry composition for a secondary battery of claim 1, wherein the nitrile-based copolymer is a hydrogenated acrylonitrile-butadiene copolymer.

5. The positive electrode slurry composition for a secondary battery of claim 1, wherein the nitrile-based copolymer has a weight-average molecular weight of 10,000 g/mol to 100,000 g/mol.

6. The positive electrode slurry composition for a secondary battery of claim 1, wherein the nitrile-based copolymer and the polymer dispersant are included in a weight ratio of 1:1 to 5:1.

7. The positive electrode slurry composition for a secondary battery of claim 1, wherein
   the lithium iron phosphate-based positive electrode active material is present in an amount of 85 parts by weight to 99.7 parts by weight,
   wherein the binder is present in an amount 0.1 part by weight to 10 parts by weight,
   wherein the conductive agent is present in an amount of 0.1 part by weight to 5 parts by weight, and
   wherein the dispersant is present in an amount of 0.1 part by weight to 3 parts by weight, based on 100 parts by weight of a total solid content in the positive electrode slurry composition.

8. The positive electrode slurry composition for a secondary battery of claim 1, wherein the positive electrode slurry composition has a solid content of 60 wt % to 85 wt %.

9. The positive electrode slurry composition for a secondary battery of claim 1, wherein the positive electrode slurry composition has a viscosity measured at 1 rpm and 25° C. of 20 Pa·s or less.

10. A positive electrode prepared by using the positive electrode slurry composition for a secondary battery of claim 1.

11. A lithium secondary battery comprising the positive electrode of claim 10.

* * * * *